(12) United States Patent
Kuwaki (10) Patent No.: US 9,697,390 B2
(45) Date of Patent: Jul. 4, 2017

(54) CARD READER

(71) Applicant: NIDEC SANKYO CORPORATION, Suwa-gun, Nagano (JP)

(72) Inventor: Hirofumi Kuwaki, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 0 days.

(21) Appl. No.: 15/035,360

(22) PCT Filed: Oct. 24, 2014

(86) PCT No.: PCT/JP2014/078313
§ 371 (c)(1),
(2) Date: May 9, 2016

(87) PCT Pub. No.: WO2015/068590
PCT Pub. Date: May 14, 2015

(65) Prior Publication Data
US 2016/0300084 A1    Oct. 13, 2016

(30) Foreign Application Priority Data
Nov. 8, 2013  (JP) .................................. 2013-231660

(51) Int. Cl.
*G06K 7/00* (2006.01)
*G06K 7/08* (2006.01)

(52) U.S. Cl.
CPC ........... *G06K 7/087* (2013.01); *G06K 7/0091* (2013.01)

(58) Field of Classification Search
CPC .. G06K 7/0021; G06K 7/0026; G06K 7/0013; G06K 7/0056; G06K 7/0091; G06K 19/00; G06K 19/005
See application file for complete search history.

(56) References Cited

U.S. PATENT DOCUMENTS 5,698,832 A * 12/1997 Someya ............. G06K 13/0893
235/38
5,949,047 A * 9/1999 Abe ...................... G06K 7/0021
235/435

(Continued)

FOREIGN PATENT DOCUMENTS

| JP | H10198752 A | 7/1998 |
|----|-------------|--------|
| JP | 2011040029 A | 2/2011 |
| JP | 2011180628 A | 9/2011 |

OTHER PUBLICATIONS

International Search Report corresponding to Application No. PCT/JP2014/078313; Date of Mailing: Dec. 22, 2014, with English translation.

*Primary Examiner* — Thien M Le
*Assistant Examiner* — April Taylor
(74) *Attorney, Agent, or Firm* — Cantor Colburn LLP (57) ABSTRACT

A card reader may include a plurality of IC contact points to communicate data with a card; an IC contact block holding the plurality of the IC contact points; a cable including a first end side connected with the plurality of the IC contact points; a control circuit board with which a second end side of the cable is connected; a front face cover which including an insertion port for the card; a main body frame which is fixed to the front face cover; and a sealing member which is formed in a ring shape and is disposed between the front face cover and the main body frame.

10 Claims, 6 Drawing Sheets

(56) References Cited

U.S. PATENT DOCUMENTS

| | | | | |
|---|---|---|---|---|
| 6,176,426 B1 * | 1/2001 | Kanayama | ............ | G06K 7/084 235/379 |
| 6,834,801 B2 * | 12/2004 | Ishikawa | ............ | G06K 7/0026 235/439 |
| 8,251,293 B2 * | 8/2012 | Nagata | ............ | G06K 13/08 235/475 |
| 8,690,058 B2 * | 4/2014 | Watanabe | ............ | G06K 7/084 235/379 |
| 9,027,834 B2 * | 5/2015 | Watanabe | ............ | G06K 13/08 235/449 |

* cited by examiner

Fig. 7

CARD READER

CROSS REFERENCE TO RELATED APPLICATIONS

This is the U.S. national stage of application No. PCT/JP2014/078313, filed on Oct. 24, 2014. Priority under 35 U.S.C. §119(a) and 35 U.S.C. §365(b) is claimed from Japanese Application No. 2013-231660, filed Nov. 8, 2013, the disclosure of which is incorporated herein by reference.

FIELD OF INVENTION

At least an embodiment of the present invention relates to a card reader including IC contact points structured to perform data communication with an IC chip incorporated into a card.

BACKGROUND

Conventionally, a so-called dip-type card reader has been known in which magnetic data recorded on a card are read when the card inserted into the card reader is extracted (see, for example, Patent Literature 1). The card reader described in Patent Literature 1 includes a front face frame which is formed with an insertion port for a card, a main body frame which is fixed to the front face frame, a control circuit board with which a magnetic head is connected through a cable, and a sealing member disposed between the front face frame and the main body frame. The card reader is mounted on a predetermined host apparatus and used.

In the card reader described in Patent Literature 1, the main body frame is provided with a head arrangement part in which the magnetic head is disposed, a box-shaped card accommodation part in which a tip end side of a card inserted through the insertion port is accommodated, and a seal arrangement part which is formed between the head arrangement part and the card accommodation part and in which a sealing member is disposed so that its inner periphery of the sealing member is abutted. The front face frame is provided with a front face part structuring a front face of the card reader and a tube part which is formed so as to be connected with the front face part and is formed toward a rear side from the front face part. The head arrangement part of the main body frame is disposed on an inner peripheral side of the tube part of the front face frame and a card inserted from the insertion port is passed on an inner peripheral side of the tube part. Further, a rear side portion of the tube part is formed as a seal crushing part which crushes the sealing member in a radial direction from an outer peripheral side of the sealing member.

The card reader described in Patent Literature 1 is structured as describe above and thus, in the card reader, liquid such as water entered through the insertion port can be prevented from entering into a portion where the control circuit board is disposed by the sealing member disposed between the front face frame and the main body frame. In the card reader described in Patent Literature 1, a front face part of the front face frame is disposed in an opening part formed in a front panel of a host apparatus and structures a part of the front panel of the host apparatus. The front face part is fixed to the front panel of the host apparatus through a predetermined sealing member so that liquid does not enter to a rear side of the front panel through the opening part of the front panel of the host apparatus. Therefore, in the card reader, liquid can be prevented from entering into a portion where the control circuit board is disposed.

Further, conventionally, a contact type IC card reader has been widely utilized which includes a plurality of IC contact points for performing data communication with a contact type IC card in which an IC chip is incorporated.

CITATION LIST

Patent Literature

[PTL 1] Japanese Patent Laid-Open No. 2011-40029

As described above, a structure is disclosed in the Patent Literature 1 which prevents liquid such as water entered through the insertion port for a card from entering into an arrangement portion of the control circuit board connected with the magnetic head through a cable. However, a structure is not disclosed in the Patent Literature 1 which prevents liquid such as water entered through the card insertion port from entering into an arrangement portion of the control circuit board with which a plurality of IC contact points is connected through a cable.

SUMMARY

In view of the problem described above, at least an embodiment of the present invention provides a card reader including IC contact points for performing data communication with an IC chip incorporated in a card, the card reader capable of preventing liquid entered through the insertion port for a card from entering into an arrangement portion of a control circuit board with which a plurality of IC contact points is connected through a cable.

To achieve the above, at least an embodiment of the present invention provides a card reader including a plurality of IC contact points structured to communicate data with an IC chip incorporated in a card, an IC contact block which holds the plurality of the IC contact points, a cable whose one end side is connected with the plurality of the IC contact points, a control circuit board with which the other end side of the cable is connected, a front face cover which is formed with an insertion port for the card, a main body frame which is fixed to the front face cover, and a sealing member which is formed in a ring shape and is disposed between the front face cover and the main body frame. When an inserting direction of the card which is one of moving directions of the card is referred to as a first direction, an extracting direction of the card which is the other of the moving directions of the card is referred to as a second direction, one side in a thickness direction of the card which is perpendicular to the moving direction of the card is referred to as a third direction, and the other side in the thickness direction of the card is referred to as a fourth direction, the main body frame includes a card accommodation part in which a first direction side of the card inserted into the insertion port is accommodated, and a seal arrangement part which is disposed on a second direction side relative to the card accommodation part and in which the sealing member is disposed so that an inner periphery of the sealing member is abutted. The card accommodation part includes an accommodation main body part in which the first direction side of the card is accommodated and a cover member which is fixed from a third direction side to a first side face part of the accommodation main body part that is a side face on the third direction side. The first side face part is formed with an opening part in which the IC contact block is disposed so as to penetrate through the first side face part, and the cover member is fixed to the first side face part so as to cover the IC contact block and the opening part. A second direction end of the seal arrangement part is formed with a passage port where the first direction end of the card inserted into the insertion port is passed, and the control circuit board is disposed outside the card accommodation part on the first direction side relative to the passage port. The front face cover is provided with a tube part in a tube shape which is disposed on at least the first direction side of the front face cover so as to surround a portion where the card is passed, an inner peripheral face of the tube part crushes the sealing member in a radial direction from an outer peripheral side of the sealing member, and a portion on the first direction side of the main body frame relative to the passage port is sealed.

In the card reader in accordance with at least an embodiment of the present invention, the first side face part of the card accommodation part structuring the main body frame is formed with an opening part in which the IC contact block is disposed. However, the first side face part is fixed with a cover member covering the IC contact block and the opening part from the third direction side, and a portion on the first direction side of the main body frame relative to a passage port formed at the second direction end of the seal arrangement part is sealed and closed. Further, in at least an embodiment of the present invention, a ring-shaped sealing member is disposed in the seal arrangement part disposed on the second direction side relative to the card accommodation part, and an inner peripheral face of the tube part which is disposed on at least the first direction side of the front face cover so as to surround a portion where a card is passed crushes the sealing member in a radial direction from an outer peripheral side of the sealing member. In addition, in at least an embodiment of the present invention, the control circuit board with which a plurality of the IC contact points are connected through the cable is disposed outside the card accommodation part on the first direction side relative to the passage port. Therefore, according to at least an embodiment of the present invention, liquid entered through the insertion port for a card can be prevented from entering to an arrangement portion of the control circuit board with which a plurality of IC contact points is connected through the cable.

In at least an embodiment of the present invention, it is preferable that a portion of the first side face part which is covered by the cover member is formed with a through-hole penetrating through the first side face part. According to this structure, liquid accumulated between the first side face part and the cover member can be drained to an inside of the card accommodation part through the through-hole and, as a result, the liquid drained to the inside of the card accommodation part can be discharged to the outside of the card reader through the insertion port formed in the front face cover.

In at least an embodiment of the present invention, it is preferable that, when a direction perpendicular to the moving direction of the card and the thickness direction of the card is referred to as a fifth direction, the card reader is arranged so that the fifth direction is coincided with a vertical direction, and the through-hole is formed on a lower end side of a portion of the first side face part which is covered by the cover member. According to this structure, liquid accumulated between the first side face part and the cover member can be effectively drained to an inside of the card accommodation part through the through-hole.

Further, in this case, it is preferable that the cover member is provided with a lower wall part structuring an under face of the cover member, and an upper face of the lower wall part is inclined with respect to the moving direction of the card when viewed in the thickness direction of the card so that liquid accumulated between the first side face part and the cover member flows toward the through-hole. According to this structure, liquid accumulated between the first side face part and the cover member can be further effectively drained to the inside of the card accommodation part through the through-hole.

Further, in a case that the through-hole is formed on a lower end side of a portion of the first side face part which is covered by the cover member, it is preferable that the cover member is formed so that its shape when viewed in the thickness direction of the card is a substantially polygonal frame shape and is provided with a side wall part parallel to the thickness direction of the card, and an inner side face of each of corner parts of the side wall part whose shape when viewed in the thickness direction of the card is a substantially polygonal frame shape is formed in a curved face. In a case that an inner peripheral face of each of the corner parts of the side wall part of the cover member is formed so that two flat faces are connected with each other, liquid is easy to be accumulated by operation of surface tension on an inner peripheral face of each of the corner parts of the side wall part. However, according to this structure, liquid is hard to be accumulated on an inner peripheral face of each of the corner parts of the side wall part. Therefore, liquid accumulated between the first side face part and the cover member can be further effectively drained to an inside of the card accommodation part through the through-hole.

In at least an embodiment of the present invention, it is preferable that the through-hole is formed in a circular shape, or in an elongated circular shape whose longitudinal direction is the moving direction of the card, or in an elliptic shape whose major axis direction is the moving direction of the card. According to this structure, even when the through-hole is formed in the first side face part structuring a side face of the accommodation main body part, an end part of an inserted card is hard to be caught by the through-hole.

In at least an embodiment of the present invention, it is preferable that the IC contact block is movable in the moving direction of the card, the cable is a flexible printed circuit board, the accommodation main body part is provided with a second side face part which is a side face on a fourth direction side of the accommodation main body part, the first side face part is formed with a second opening part for leading around the cable on a first direction side relative to the opening part so as to penetrate through the first side face part, and the second opening part is covered by the cover member and the second side face part is formed with a recessed part which is recessed toward the fourth direction at a position facing the second opening part. According to this structure, the cable which is a flexible printed circuit board can be loosely led around by utilizing the second opening part and the recessed part. Therefore, even when the cable is moved together with the IC contact block which is moved in the moving direction of a card, a load can be prevented from concentrating on a particular portion of the cable and thus disconnection of the cable is prevented. Further, in a case that a space in the first direction side portion of the card accommodation part is narrow, liquid reached to the first direction side portion of the card accommodation part is easily accumulated in the first direction side portion of the card accommodation part by operation of its surface tension. However, according to this structure, a relatively large space can be formed in the first direction side portion of the card accommodation part and thus liquid is hard to be accumulated in the first direction side portion of the card accommodation part. Further, according to this structure, a relatively large space can be formed in the first direction side portion of the card accommodation part and thus dust and dirt entered to the first direction side portion of the card accommodation part can be discharged together with liquid.

In at least an embodiment of the present invention, for example, sealing material is applied to an attaching portion of the cover member to the first side face part.

In at least an embodiment of the present invention, it is preferable that sealing material is applied to a connected portion of the plurality of IC contact points with the cable. According to this structure, even when the connected portion of the IC contact points with the cable is disposed in an area where liquid may enter, a short circuit due to liquid adhered on the connected portion of a plurality of the IC contact points with the cable can be prevented.

In at least an embodiment of the present invention, it is preferable that, when a direction perpendicular to the moving direction of the card and the thickness direction of the card is referred to as a fifth direction, the IC contact block is movable in the moving direction of the card, and the first side face part is formed with a guide part which prevents displacement in the fifth direction of the IC contact block moved in the moving direction of the card. According to this structure, rattling in the fifth direction of the IC contact block which is moved in the moving direction of the card is prevented and thus a terminal part formed on the surface of the card can be surely contacted with the IC contact points.

Effects of the Invention

As described above, in accordance with at least an embodiment of the present invention, in a card reader including the IC contact points for performing data communication with an IC chip incorporated in a card, liquid entered through the insertion port for a card can be prevented from entering to an arrangement portion of the control circuit board with which a plurality of the IC contact points is connected through the cable.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the accompanying drawings.
(Schematic Structure of Card Reader)

Figure 1:
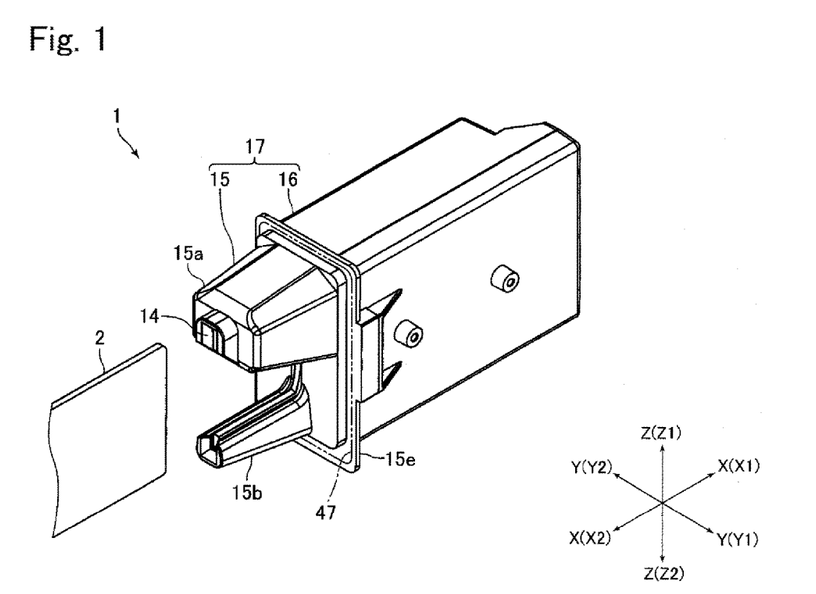
FIG. 1 is a perspective view showing a card reader in accordance with an embodiment of the present invention.
Figure 2:
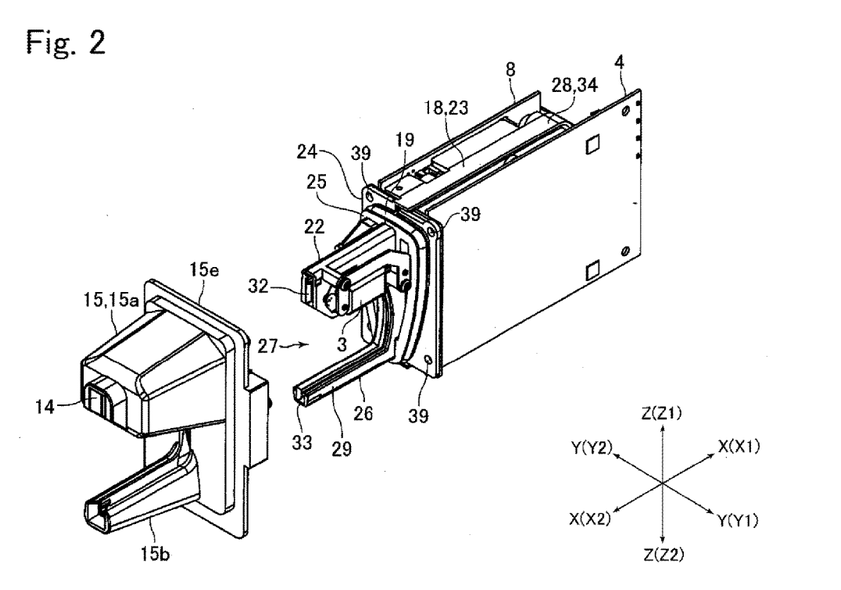
FIG. 2 is an exploded perspective view showing a state that a case body is detached from the card reader shown in FIG. 1.
Figure 3:
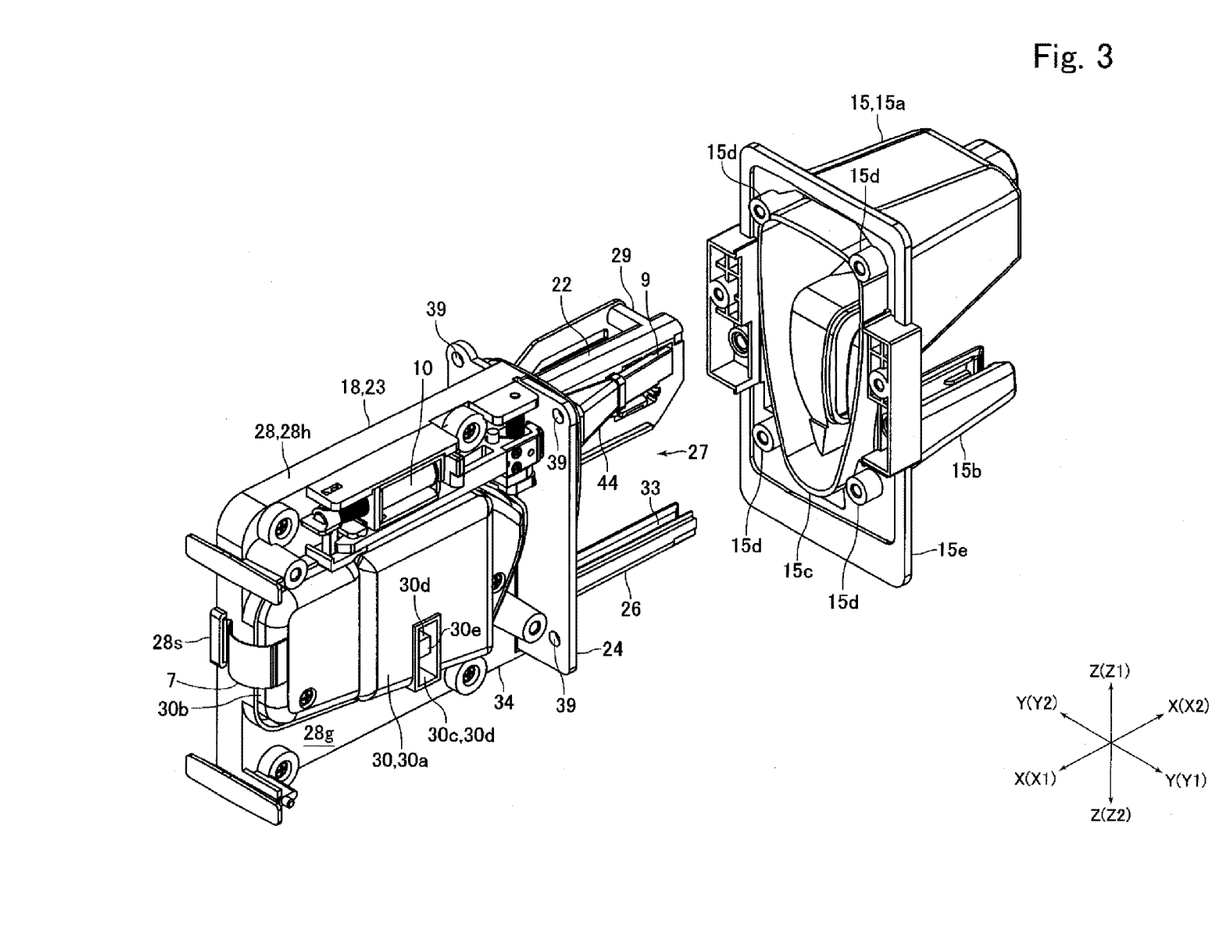
FIG. 3 is an exploded perspective view showing a state that control circuit boards are detached from the state shown in FIG. 2 and viewed from another direction.
Figure 4:
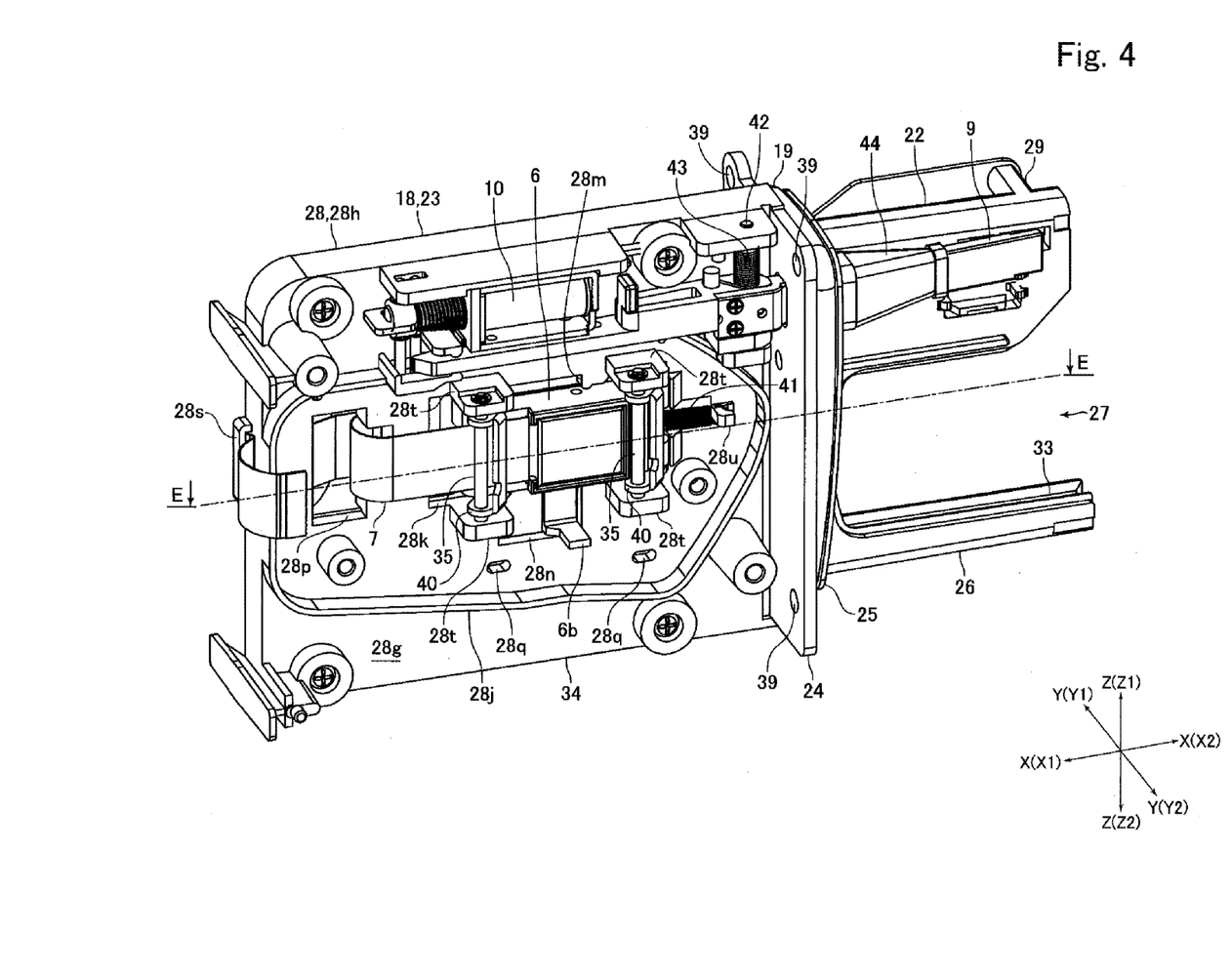
FIG. 4 is a perspective view showing a state that a cover member is detached from the state shown in FIG. 3 and viewed from another direction.
Figure 5:
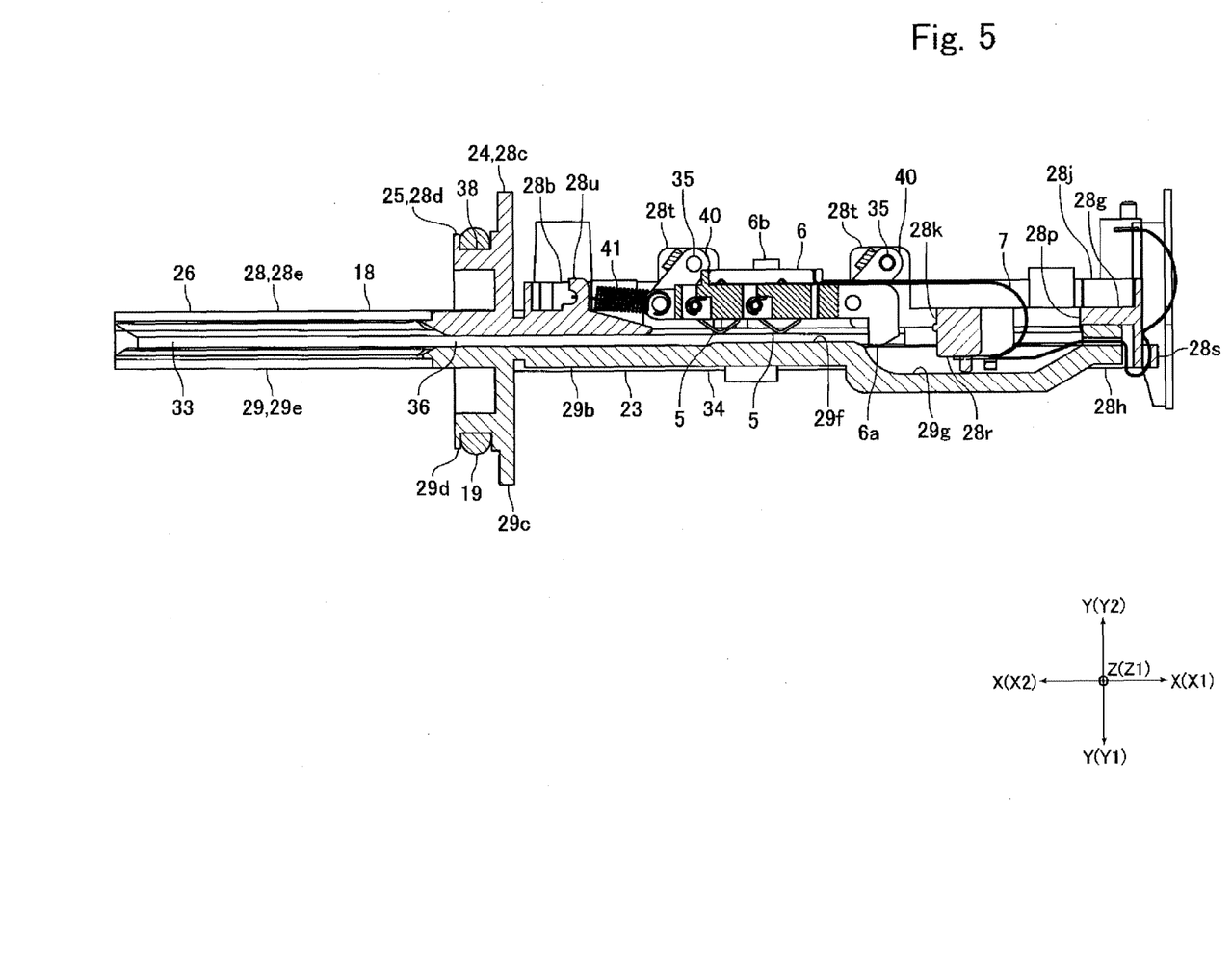
FIG. 5 is a cross-sectional view showing the "E-E" cross section in FIG. 4.

FIG. 1 is a perspective view showing a card reader 1 in accordance with an embodiment of the present invention. FIG. 2 is an exploded perspective view showing a state that a case body 17 is detached from the card reader 1 shown in FIG. 1. FIG. 3 is an exploded perspective view showing a state that control circuit boards 4 and 8 are detached from the state shown in FIG. 2 and viewed from another direction. FIG. 4 is a perspective view showing a state that a cover member 30 is detached from the state shown in FIG. 3 and viewed from another direction. FIG. 5 is a cross-sectional view showing the "E-E" cross section in FIG. 4. In FIG. 2, a case main body 16 is not shown.

A card reader 1 in this embodiment is a device in which a card 2 is manually operated by a user to perform reading of data recorded in the card 2 and recording data to the card 2. Specifically, the card reader 1 is a so-called dip-type card reader in which insertion of a card 2 to the card reader 1 and extraction of the card 2 from the card reader 1 are manually performed to read and record data. The card reader 1 is, for example, mounted and used in a host apparatus such as an oiling device in an unattended or a self-service system gas station.

The Card reader 1 includes, as shown in FIGS. 2 through 5, a magnetic head 3 structured to perform reading of magnetic data recorded on a card 2, a control circuit board 4 with which lead wires (not shown) extended from the magnetic head 3 are connected, a plurality of IC contact points 5 for performing data communication with an IC chip incorporated into the card 2, an IC contact block 6 which holds a plurality of the IC contact points 5, a cable 7 whose one end side is connected with the plurality of the IC contact points 5, a control circuit board 8 with which the other end side of the cable 7 is connected, a lock lever 9 for preventing extraction of the card 2 inserted into the card reader 1, and a solenoid 10 structured to drive the lock lever 9. The cable 7 in this embodiment is a flexible printed circuit board.

The card reader 1 includes a case body 17 structured of a front face cover 15 formed with an insertion port 14 for a card 2 and a case main body 16, a main body frame 18 which is fixed to the front face cover 15 and is accommodated in the case body 17, and a sealing member 19 which is disposed between the front face cover 15 and the main body frame 18. The sealing member 19 is formed of rubber or the like and is formed in a ring shape.

In this embodiment, a card 2 which is manually operated is moved in an "X" direction shown in FIG. 1 and the like. Specifically, a card 2 is inserted in an "X1" direction and the card 2 is extracted in an "X2" direction. In other words, the "X" direction is a moving direction of a card 2, and the "X1" direction is an inserting direction of the card 2 that is one side of a moving direction of the card 2 and the "X2" direction is an extraction direction of the card 2 that is the other side of the moving direction of the card 2. Further, a "Y" direction in FIG. 1 and the like perpendicular to the "X" direction is a thickness direction of a card 2 inserted into the card reader 1, and a "Z" direction in FIG. 1 and the like perpendicular to the "X" direction and the "Y" direction is a width direction (short width direction) of a card 2 inserted into the card reader 1. In this embodiment, the card reader 1 is disposed so that the "Z" direction and a vertical direction (gravity direction) are coincided with each other. In the following descriptions, the "X1" direction side is referred to as a "back (rear)" side, the "X2" direction side is referred to as a "front" side, a "Y1" direction side is a "right" side, a "Y2" direction side is a "left" side, a "Z1" direction side is an "upper" side, and a "Z2" direction side is a "lower" side. The "X1" direction in this embodiment is a first direction, the "X2" direction is a second direction, the "Y1" direction is a fourth direction, the "Y2" direction is a third direction, and the "Z" direction is a fifth direction.

A card 2 is, for example, a rectangular card made of vinyl chloride whose thickness is about 0.7-0.8 mm. A magnetic stripe in which magnetic data are recorded is formed on one face of a card 2. Further, an IC chip is incorporated into the card 2. The other face of the card 2 is fixed with a terminal part comprised of a plurality of contact point terminals which are electrically connected with an IC chip. In accordance with an embodiment of the present invention, a card 2 may be a PET (polyethylene terephthalate) card whose thickness is about 0.18-0.36 mm or may be a paper card having a predetermined thickness.

(Structure of Main Body Frame and Components Attached to Main Body Frame)

Figure 6:
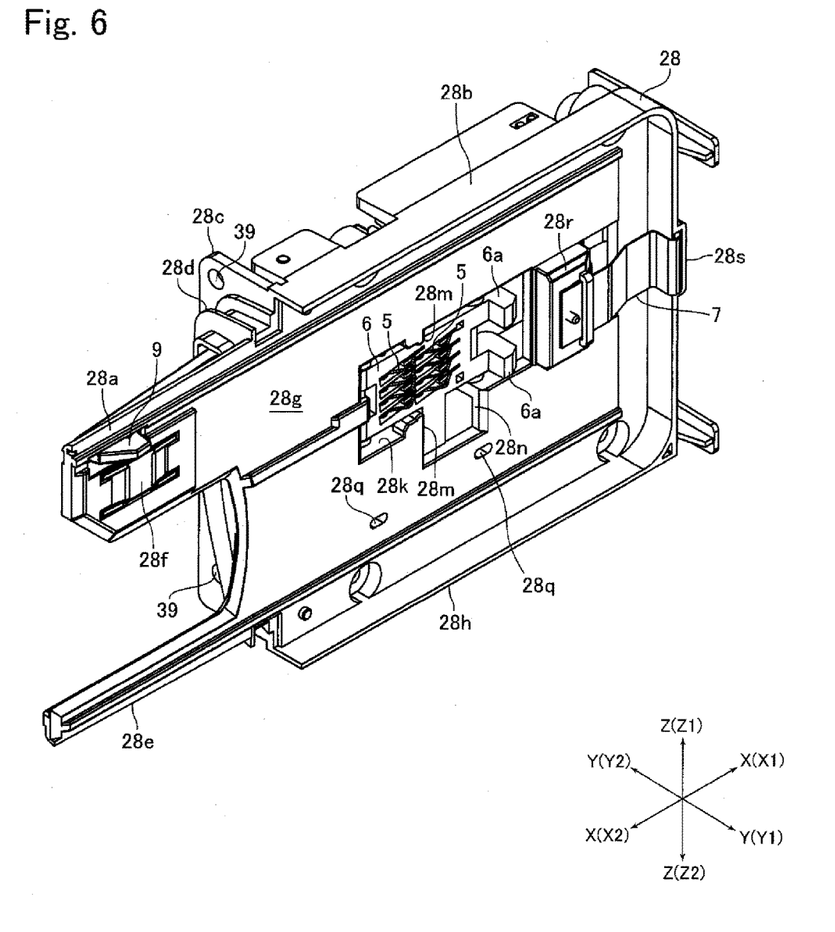
FIG. 6 is a perspective view showing a first frame and components attached to the first frame shown in FIG. 3 which are viewed from another direction.
Figure 7:
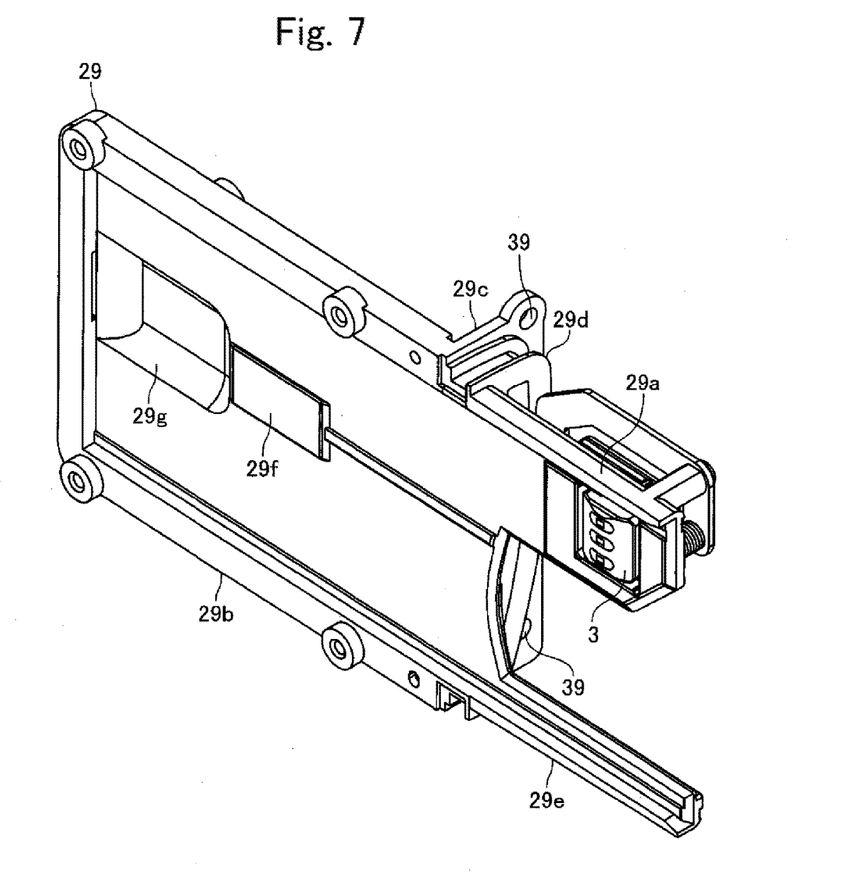
FIG. 7 is a perspective view showing a second frame and components attached to the second frame shown in FIG. 3 which are viewed from another direction.

FIG. 6 is a perspective view showing a first frame 28 and components attached to the first frame 28 shown in FIG. 3 which are viewed from another direction. FIG. 7 is a perspective view showing a second frame 29 and components attached to the second frame 29 shown in FIG. 3 which are viewed from another direction.

The main body frame 18 includes a head arrangement part 22 where a magnetic head 3 is disposed, a card accommodation part 23 in a box shape in which a rear end side of a card 2 inserted through the insertion port 14 is accommodated, a partition part 24 which is formed between the head arrangement part 22 and the card accommodation part 23, a seal arrangement part 25 which is formed between the head arrangement part 22 and the partition part 24 and in which a sealing member 19 is disposed, and a card guide part 26 for guiding the card 2 inserted through the insertion port 14. Rear ends of the head arrangement part 22 and the card guide part 26 are connected with a front end of the seal arrangement part 25, a rear end of the seal arrangement part 25 is connected with a front end of the partition part 24, and a rear end of the partition part 24 is connected with a front end of the card accommodation part 23.

As shown in FIGS. 4 and 5, the head arrangement part 22 and the card guide part 26 are formed so as to protrude to a front side from the seal arrangement part 25. Further, the head arrangement part 22 is disposed on an upper end side of the main body frame 18 and the card guide part 26 is disposed on a lower end side of the main body frame 18. A cut-out part 27 is formed between the head arrangement part 22 and the card guide part 26 in the upper and lower direction.

The main body frame 18 is structured of a first frame 28 and a second frame 29 divided into two pieces in the right and left direction and a cover member 30 which is fixed to the first frame 28. In this embodiment, a left side portion of the main body frame 18 is structured of the first frame 28 and the cover member 30 and a right side portion of the main body frame 18 is structured of the second frame 29. The first frame 28 and the second frame 29 are fixed to each other with screws disposed at four corners of the card accommodation part 23. Further, the first frame 28 is attached with the IC contact block 6, the control circuit board 8, the lock lever 9 and the solenoid 10 and the second frame 29 is attached with the magnetic head 3 and the control circuit board 4.

The first frame 28 is, as shown in FIG. 6, provided with a first head arrangement part 28a which structures a part of the head arrangement part 22, a first accommodation frame part 28b which structures a part of the card accommodation part 23, a first partition part 28c which structures a part of the partition part 24, a first seal arrangement frame part 28d which structures a part of the seal arrangement part 25, and a first card guide frame part 28e which structures a part of the card guide part 26.

The second frame 29 is, as shown in FIG. 7, provided with a second head arrangement part 29a which structures the head arrangement part 22 together with the first head arrangement part 28a, a second accommodation frame part 29b which structures the card accommodation part 23 together with the first accommodation frame part 28b, a second partition part 29c which structures the partition part 24 together with the first partition part 28c, a second seal arrangement frame part 29d which structures the seal arrangement part 25 together with the first seal arrangement frame part 28d, and a second card guide frame part 29e which structures the card guide part 26 together with the first card guide frame part 28e.

The second head arrangement part 29a is formed with an arrangement hole where the magnetic head 3 is disposed. The arrangement hole is formed so as to penetrate through the second head arrangement part 29a in the right and left direction. A right side face of the first head arrangement part 28a is formed with a head facing part 28f for increasing contact pressure of the magnetic head 3 with a card 2 (see FIG. 6). The head facing part 28f is formed so as to protrude to the right side. Further, the first head arrangement part 28a is formed with an arrangement hole where a front end portion of the lock lever 9 is disposed. The arrangement hole is formed so as to penetrate through the first head arrangement part 28a in the right and left direction.

A card guide groove 32 for guiding an upper end side of a card 2 inserted into the insertion port 14 is formed between the first head arrangement part 28a and the second head arrangement part 29a (see FIG. 2). Further, a card guide groove 33 for guiding a lower end side of a card 2 inserted into the insertion port 14 is formed between the first card guide frame part 28e and the second card guide frame part 29e. The magnetic head 3 is disposed so that a gap part of the magnetic head 3 and the head facing part 28f are faced each other in an inside of the card guide groove 32.

The first accommodation frame part 28b and the second accommodation frame part 29b are formed so that their shapes when viewed in the right and left direction are substantially rectangular shapes. In this embodiment, an accommodation main body part 34 in which a rear end side of a card 2 is accommodated is structured of the first accommodation frame part 28b and the second accommodation frame 29b. Further, in this embodiment, the card accommodation part 23 is structured of the accommodation main body part 34 and the cover member 30. The card accommodation part 23 is formed in a box shape as described above. In other words, the card accommodation part 23 is formed in a box shape whose front end is opened and its rear end is closed.

The first accommodation frame part 28b is provided with a first side face part 28g which is a left side face of the accommodation main body part 34, a first wall part 28h which is stood up from a right side face of the first side face part 28g toward the right side, and a second wall part 28j which is stood up from a left side face of the first side face part 28g toward the left side. The first side face part 28g is formed in a substantially rectangular shape which is long in the front and rear direction. A front end of the first side face part 28g is connected with the first partition part 28c. The first wall part 28*h* is stood up from both of the upper and lower ends and the rear end of the first side face part 28*g* toward the right side.

The second wall part 28*j* is formed in a substantially pentagonal ring shape when viewed in the right and left direction. As shown in FIG. 4, a rear end portion of the second wall part 28*j* is formed in a flat face shape which is substantially parallel to the "Y-Z" plane structured of the right and left direction and the upper and lower direction and is stood up from the rear end of the first side face part 28*g* toward the left side. A front end portion of the second wall part 28*j* is a vertex portion of the second wall part 28*j* which is formed in a substantially pentagonal ring shape. A front end of the second wall part 28*j* is substantially coincided with a front end of the first side face part 28*g* and is abutted with the first partition part 28*c*. An upper end portion of the second wall part 28*j* is formed in a flat face shape which is substantially parallel to the "X-Y" plane structured of the front and rear direction and the right and left direction. An upper end portion of the second wall part 28*j* is formed on a lower side relative to the upper end of the first side face part 28*g*. A lower end portion of the second wall part 28*j* is formed in a substantially flat face shape which is inclined with respect to the "X-Y" plane structured of the front and rear direction and the right and left direction. The lower end portion of the second wall part 28*j* is inclined to the lower side as going to the front side. Further, the lower end portion of the second wall part 28*j* is formed on an upper side relative to a lower end of the first side face part 28*g*.

An opening part 28*k* where an IC contact block 6 is disposed is formed at a substantially center of the first side face part 28*g* in the front and rear direction. The opening part 28*k* is formed so as to penetrate through the first side face part 28*g* in the right and left direction. Further, the opening part 28*k* is formed in a substantially rectangular shape which is long in the front and rear direction. Further, the opening part 28*k* is formed on an inner peripheral side of the second wall part 28*j* formed in a ring shape. Guide parts 28*m* for preventing displacement in the upper and lower direction of the IC contact block 6 are formed at both edges in the upper and lower direction of the opening part 28*k* (see FIG. 6). The guide parts 28*m* are formed so as to protrude to inner sides in the upper and lower direction from both edges in the upper and lower direction of the opening part 28*k*.

An opening part 28*n* where a detection lever part 6*b* described below structuring the IC contact block 6 is disposed is formed at a substantially center of the first side face part 28*g* in the front and rear direction. The opening part 28*n* is formed so as to penetrate through the first side face part 28*g* in the right and left direction. Further, the opening part 28*n* is formed to an inner peripheral side of the second wall part 28*j* formed in a ring shape. Further, the opening part 28*n* is formed so as to be connected with the opening part 28*k* from a lower side. A width in the front and rear direction of the opening part 28*n* is set to be narrower than a width in the front and rear direction of the opening part 28*k*.

An opening part 28*p* for extending around the cable 7 is formed to a rear side of the opening part 28*k* in the first side face part 28*g* (see FIG. 4). The opening part 28*p* is formed so as to penetrate through the first side face part 28*g* in the right and left direction. Further, the opening part 28*p* is formed in a substantially rectangular shape which is long in the upper and lower direction. Further, the opening part 28*p* is formed to an inner peripheral side of the second wall part 28*j* formed in a ring shape. The opening part 28*p* in this embodiment is a second opening part.

Two through-holes 28*q* are formed to a lower side of the opening part 28*k* in the first side face part 28*g* so as to penetrate through the first side face part 28*g* in the right and left direction. The two through-holes 28*q* are formed to an inner peripheral side of the second wall part 28*j* formed in a ring shape. Further, the two through-holes 28*q* are formed in a separated state with a predetermined space therebetween in the front and rear direction. Specifically, as shown in FIG. 4, the through-hole 28*q* which is disposed on a front side is formed to a substantially upper side of a front end of a lower end portion of the second wall part 28*j*. The through-hole 28*q* which is disposed on a rear side is formed to an upper side of a substantially center in the front and rear direction of the lower end portion of the second wall part 28*j*. Further, the through-hole 28*q* which is disposed on the front side is formed on a lower side relative to the through-hole 28*q* disposed on the rear side. The through-hole 28*q* in this embodiment is formed in an elongated circular shape whose longitudinal direction is the front and rear direction. In accordance with an embodiment of the present invention, the through-hole 28*q* may be formed in a circular shape or may be formed in an elliptic shape whose major axis direction is the front and rear direction.

A cable holding part 28*r* for holding a middle portion of the cable 7 is formed on a right side face of the first side face part 28*g* as shown in FIG. 6. The cable holding part 28*r* is formed on a front side of the opening part 28*p*. Further, the cable holding part 28*r* is formed so as to protrude to the right side. The cable 7 which is folded back at 180° is held by the cable holding part 28*r*. A rear face portion of the first wall part 28*h* is, as described below, formed with a guide part 28*s* for leading around the cable 7 extended to the rear side from the card accommodation part 23 to the left side.

A left side face of the first side face part 28*g* is, as shown in FIG. 4, formed with shaft holding parts 28*t* which hold both end sides of two support shafts 35 disposed in a separated state with a predetermined distance therebetween in the front and rear direction. The shaft holding part 28*t* is formed so as to stand from the left side face of the first side face part 28*g* toward a left side. Further, the shaft holding parts 28*t* are formed so as to stand from both edges in the upper and lower direction of the opening part 28*k*. Further, the shaft holding parts 28*t* are formed to inner peripheral sides of the second wall part 28*j* formed in a ring shape. The shaft holding parts 28*t* disposed on the lower side are formed on the upper side relative to the through-holes 28*q*.

The left side face of the first side face part 28*g* is formed with an engagement projection 28*u* to which a front end side of a tension coil spring 41 described below is attached. The engagement projection 28*u* is formed so as to stand from the left side face of the first side face part 28*g* toward a left side. Further, the engagement projection 28*u* is formed to a front side of the opening part 28*k*. Further, the engagement projection 28*u* is formed to an inner peripheral side of the second wall part 28*j* formed in a ring shape.

The second accommodation frame part 29*b* structures a right side face of the accommodation main body part 34. A front end of the second accommodation frame part 29*b* is connected with the second partition part 29*c*. A left side face of the second accommodation frame part 29*b* is formed with a contact point facing part 29*f* for increasing contact pressure of the IC contact points 5 with a card 2 (see FIG. 7). The contact point facing part 29*f* is formed so as to protrude to the left side and is disposed so as to face the IC contact points 5 from the left side. Further, the left side face of the second accommodation frame part 29*b* is formed with a recessed part 29*g* which is recessed toward the right side.

The recessed part 29g is formed on a rear side relative to the contact point facing part 29f. Further, the recessed part 29g is formed at a position facing the opening part 28p and the cable holding part 28r. The second accommodation frame part 29b in this embodiment is a second side face part structuring the right side face of the accommodation main body part 34.

The first accommodation frame part 28b and the second accommodation frame part 29b are joined to each other on the both end sides in the upper and lower direction and the rear end side. In this embodiment, the first accommodation frame part 28b and the second accommodation frame part 29b are joined to each other in a state that both ends in the upper and lower direction and the rear end of the second accommodation frame part 29b are disposed on an inner peripheral side of the first wall part 28h. Sealing material such as silicon is applied between the both ends in the upper and lower direction and the rear end of the second accommodation frame part 29b and an inner peripheral face of the first wall part 28h over the entire region. In other words, sealing material is applied to both end portions in the upper and lower direction and the rear end portion of the card accommodation part 23 which are a joined portion of the first accommodation frame part 28b with the second accommodation frame part 29b. Further, the sealing material is filled between the both ends in the upper and lower direction and the rear end of the second accommodation frame part 29b and the inner peripheral face of the first wall part 28h.

The cover member 30 is formed of a light transmissive member which transmits light. Specifically, the cover member 30 is formed of transparent or translucent resin material. Further, the cover member 30 is, as shown in FIG. 3, formed in a substantially pentagonal shape when viewed in the right and left direction. Specifically, an outward form of the cover member 30 when viewed in the right and left direction is similar to the shape of the second wall part 28j and is formed in a substantially pentagonal shape which is slightly smaller than the shape of the second wall part 28j.

The cover member 30 is structured of a base part 30a and a side wall part 30b which is stood from an outer peripheral end of the base part 30a to the right side. The base part 30a is formed so that its outward form when viewed in the right and left direction is a substantially pentagonal shape and the side wall part 30b is formed so that its shape when viewed in the right and left direction is a substantially pentagonal frame shape. Further, the side wall part 30b is formed in a wall face shape which is parallel to the right and left direction. Inner side faces of five corner parts of the side wall part 30b which is formed in a substantially pentagonal frame shape are formed in curved faces. Further, an inner peripheral face of a connected portion of the base part 30a and the side wall part 30b is also formed in a curved face shape.

The cover member 30 is fixed to the first side face part 28g from a left side so that the side wall part 30b is disposed along an inner peripheral face of the second wall part 28j. In other words, the cover member 30 is fixed to the first side face part 28g so as to cover the IC contact block 6 disposed in the opening part 28k, the opening parts 28k, 28n and 28p, the through-holes 28q, the shaft holding parts 28t and the engagement projection 28u. In other words, the opening parts 28k, 28n and 28p, the through-holes 28q, the shaft holding parts 28t and the engagement projection 28u are formed in a portion of the first side face part 28g which is covered by the cover member 30. Further, the through-holes 28q are formed on a lower end side of the portion of the first side face part 28g which is covered by the cover member 30.

A right end face of the side wall part 30b of the cover member 30 which is fixed to the first side face part 28g is abutted with a left side face of the first side face part 28g. Further, sealing material such as silicon is applied between an inner peripheral face of the second wall part 28j and an outer peripheral face of the side wall part 30b over the entire periphery. In other words, sealing material is applied to an attaching portion of the cover member 30 to the first side face part 28g. Further, sealing material is filled between the inner peripheral face of the second wall part 28j and the outer peripheral face of the side wall part 30b.

The base part 30a is formed with an arrangement recessed part 30c where a sensor (not shown) for detecting a position of the IC contact block 6 is disposed. The arrangement recessed part 30c is formed so as to be recessed from the left side face of the base part 30a toward the right side. The sensor is an optical type sensor in which a light emitting part having a light emitting element and a light receiving part having a light receiving element are disposed in a separated state with a predetermined distance therebetween in the upper and lower direction. The sensor is mounted on the control circuit board 8. Further, the sensor is disposed outside the card accommodation part 23. The arrangement recessed part 30c includes a recessed part 30d in which the light emitting part is disposed and a recessed part 30d in which the light receiving part is disposed. The two recessed parts 30d are disposed in a separated state with a predetermined distance therebetween in the upper and lower direction. A lever arrangement part 30e is formed between the two recessed parts 30d so that a detection lever part 6b described below is disposed when the IC contact points 5 are contacted with a card 2.

As described above, the side wall part 30b is disposed along the second wall part 28j. Further, as described above, the lower end portion of the second wall part 28j is inclined to the lower side as going to the front side. In other words, a lower wall part which is a lower end portion of the side wall part 30b (in other words, an under face of the cover member 30) is inclined toward the lower side as going to the front side. Further, as described above, the through-holes 28q are formed on the lower end side of a portion of the first side face part 28g which is covered by the cover member 30. Further, the through-hole 28q which is disposed on the front side is formed to a substantially upper side of the front end of the lower end portion of the second wall part 28j, and the through-hole 28q which is disposed on the rear side is formed to an upper side of a substantially center in the front and rear direction of the lower end portion of the second wall part 28j.

Therefore, liquid such as water accumulated between the first side face part 28g and the cover member 30 flows toward the through-holes 28q along the lower end portion of the side wall part 30b by gravity. In other words, in this embodiment, the lower end portion (lower wall part) of the side wall part 30b is inclined with respect to the front and rear direction when viewed in the right and left direction so that liquid accumulated between the first side face part 28g and the cover member 30 flows toward the through-holes 28q.

The seal arrangement part 25 is, as shown in FIG. 5, formed with a seal arrangement groove 38 where the sealing member 19 is disposed. A flange part enlarged to both the upper and lower sides and both the right and left sides is formed on a front side of the seal arrangement groove 38. In other words, the first seal arrangement frame part 28d is formed with a flange part enlarged to both the upper and lower sides and the left side, and the second seal arrangement frame part 29*d* is formed with a flange part enlarged to both the upper and lower sides and the right side. The seal arrangement part 25 is disposed with the sealing member 19 so that an inner periphery of the sealing member 19 formed in a ring shape is abutted with a bottom face of the seal arrangement groove 38.

The first partition part 28*c* is formed in a flange shape in a substantially rectangular shape which is further enlarged to both the upper and lower sides and the left side relative to the flange part formed in the first seal arrangement frame part 28*d*. The second partition part 29*c* is formed in a flange shape in a substantially rectangular shape which is further enlarged to both the upper and lower sides and the right side relative to the flange part formed in the second seal arrangement frame part 29*d*. In other words, the partition part 24 is formed in a flange shape which is further enlarged to both the upper and lower sides and both the right and left sides relative to the seal arrangement part 25. A rear end of the first seal arrangement frame part 28*d* is connected with the first partition part 28*c*, and a rear end of the second seal arrangement frame part 29*d* is connected with the second partition part 29*c*.

A passage for a card 2 where a rear end portion of a card 2 is passed toward the card accommodation part 23 is formed on a center side of the partition part 24 and the seal arrangement part 25. A front end of the seal arrangement part 25 is formed to be a passage port 36 where a rear end of a card 2 inserted into the insertion port 14 is passed (see FIG. 5). As described above, sealing material is applied to both the upper and lower end portions and the rear end portion of the card accommodation part 23 which are a joined portion of the first accommodation frame part 28*b* with the second accommodation frame part 29*b* and sealing material is applied to the attaching portion of the cover member 30 to the first side face part 28*g*. Further, the rear end of the seal arrangement part 25 is connected with the front end of the partition part 24, and the front end of the card accommodation part 23 is connected with the rear end of the partition part 24. Therefore, in this embodiment, a rear side portion of the main body frame 18 relative to the passage port 36 is sealed and closed.

The partition part 24 is formed with insertion holes 39 into which screws (not shown) for fixing the main body frame 18 to the front face cover 15 are inserted. The insertion hole 39 is formed at two positions on an upper end side of the partition part 24 and two positions on a lower end side of the partition part 24. Further, the four insertion holes 39 are formed on outer sides in the radial direction relative to the sealing member 19 which is disposed in the seal arrangement part 25.

The partition part 24 and the seal arrangement part 25 are formed with a passage opening where lead wires extended from the magnetic head 3 are passed and a passage opening where the lock lever 9 is passed. Specifically, these passage openings are formed in the partition part 24 and the seal arrangement part 25 on inner peripheral sides relative to the sealing member 19 so as to penetrate through the partition part 24 and the seal arrangement part 25 in the front and rear direction. Further, the passage opening where the lead wires are passed is formed on the right side relative to the second accommodation frame part 29*b* and the passage opening where the lock lever 9 is passed is formed on the left side relative to the first side face part 28*g*. Sealing material such as silicon is filled in the passage opening where the lead wires are passed for sealing the passage opening in a state that the lead wires are passed. In this embodiment, sealing material such as silicon is applied to a connected portion of the magnetic head 3 with the lead wires. Specifically, sealing material is filled in the connected portion of the magnetic head 3 with the lead wires.

The control circuit board 4 is fixed to the second frame 29 and the control circuit board 8 is fixed to the first frame 28. The control circuit board 4 is disposed on the right side of the second accommodation frame part 29*b* and the control circuit board 8 is disposed on the left side of the first accommodation frame part 28*b* and the cover member 30. In other words, the control circuit boards 4 and 8 are disposed outside the card accommodation part 23. Further, the control circuit boards 4 and 8 are, as shown in FIG. 2, disposed on the rear side relative to the partition part 24. In other words, the control circuit boards 4 and 8 are disposed on the rear side relative to the passage port 36.

The IC contact block 6 is formed in a substantially rectangular solid shape. The IC contact block 6 is relatively turnably connected with one end side of a lever member 40 on each of both end sides in the front and rear direction. Further, the other end side of the lever member 40 is relatively turnably held by a support shaft 35. Therefore, the IC contact block 6 is movable in the front and rear direction and the right and left direction. A rear end side of the tension coil spring 41 is attached to a front end side of the IC contact block 6. The front end side of the tension coil spring 41 is attached to the engagement projection 28*u*, and the IC contact block 6 is urged to the front side by an urging force of the tension coil spring 41. A card abutting part 6*a* which is protruded to the right side is formed on the rear end side of the IC contact block 6. Further, the detection lever part 6*b* is formed in the lower end of the IC contact block 6.

In this embodiment, when a card 2 is not accommodated in the card accommodation part 23, the IC contact block 6 has been moved on a front left side by an urging force of the tension coil spring 41 and is disposed at a position where the IC contact block 6 does not contact with a card 2. In this case, the detection lever part 6*b* is displaced from the lever arrangement part 30*e* and is displaced from a space between the light emitting element and the light receiving element of the sensor for detecting the position of the IC contact block 6. On the other hand, when a card 2 is accommodated in the card accommodation part 23 and a rear end of the card 2 is contacted with the card abutting part 6*a*, the IC contact block 6 is moved to a rear right side and the IC contact points 5 are contacted with a terminal part formed on the card 2. In this case, the detection lever part 6*b* is disposed in the lever arrangement part 30*e* to intercept light from the light emitting element to the light receiving element of the sensor for detecting the position of the IC contact block 6.

One end side of the cable 7 is connected with a plurality of the IC contact points 5 on a left face side of the IC contact block 6. A connected portion of a plurality of the IC contact points 5 with the cable 7 is applied with sealing material such as silicon. Specifically, sealing material is filled in the connected portion of the IC contact points 5 with the cable 7 on the IC contact block 6.

The cable 7 connected with a plurality of the IC contact points 5 on the left face side of the IC contact block 6 is extended to a rear side and is led around so as to pass the opening part 28*p*. Further, as shown in FIG. 5, the cable 7 is led around so that a middle portion of the cable 7 is folded back at 180° after passing the opening part 28*p* and is held by the cable holding part 28*r* and, after that, the cable 7 is extended to the rear side and led out to the rear side through a space between the first accommodation frame part 28*b* and the second accommodation frame part 29*b*. In other words, the cable 7 is led out from the card accommodation part 23 to the rear side. Further, the cable 7 which is led out from the card accommodation part 23 to the rear side is guided by the guide part 28s and is led around to the left side and is connected to a rear end portion of the control circuit board 8.

A solenoid 10 is fixed on the left side of the first side face part 28g. The lock lever 9 is disposed on the left side of the first frame 28. The lock lever 9 is disposed so as to pass the passage openings formed in the partition part 24 and the seal arrangement part 25. In other words, a rear end portion of the lock lever 9 is disposed on the left side of the first side face part 28g, and a front end side portion of the lock lever 9 is disposed on the left side of the first head arrangement part 28a. A rear end side of the lock lever 9 is connected with the solenoid 10. The lock lever 9 is turnably held by a fixed shaft 42 which is disposed with the upper and lower direction as an axial direction (see FIG. 4). Further, the lock lever 9 is urged by a torsion coil spring 43 into which the fixed shaft 42 is inserted (see FIG. 4). The fixed shaft 42 and the torsion coil spring 43 are disposed on the rear side relative to the partition part 24.

A front end portion of the lock lever 9 is disposed in an arrangement hole formed in the first head arrangement part 28a. The lock lever 9 is urged by an urging force of the torsion coil spring 43 in a direction that a front end portion of the lock lever 9 is protruded to an inside of the card guide groove 32. Further, when the solenoid 10 is driven and the lock lever 9 is turned against an urging force of the torsion coil spring 43, the front end portion of the lock lever 9 is retreated from the card guide groove 32.

The rear end side of the lock lever 9, the solenoid 10, the fixed shaft 42 and the torsion coil spring 43 are disposed on an upper side relative to an upper end portion of the second wall part 28j and are disposed on an outer side of the card accommodation part 23. For a front side portion of the lock lever 9 relative to the seal arrangement part 25, a cover member 44 is attached for preventing liquid such as water from passing the passage openings for the lock lever 9 formed in the partition part 24 and the seal arrangement part 25 and from entering to the rear side of the partition part 24.

(Structure of Case Body)

As described above, the case body 17 is structured of the front face cover 15 and the case main body 16. The front face cover 15 is formed of resin material. The front face cover 15 is formed with a first protruded part 15a which covers the head arrangement part 22 from both the right and left sides and the upper side and a second protruded part 15b which covers the card guide part 26 from both the right and left sides and the lower side on its front face side. The rear face side of the front face cover 15 is, as shown in FIG. 3, formed with a tube part 15c formed in a substantially tube shape, screw engaging parts 15d with which screws inserted into the insertion holes 39 of the partition part 24 are threadedly engaged, and a flange part 15e which is formed in a flange shape.

The tube part 15c is formed in a tube shape whose shape when viewed in the front and rear direction is similar to the shape of the sealing member 19 which is disposed in the seal arrangement part 25. Further, the tube part 15c is formed so that a card 2 inserted into the insertion port 14 is passed on an inner peripheral side of the tube part 15c. In other words, the tube part 15c is disposed so as to surround a portion where a card 2 is passed on a rear side of the front face cover 15. An inner peripheral face of the tube part 15c is contacted with an outer peripheral face of the sealing member 19. Specifically, an inner peripheral face of the tube part 15c is contacted with an outer peripheral face of the sealing member 19 so as to crush the sealing member 19 in the radial direction from the outer peripheral side of the sealing member 19. Therefore, an inner periphery of the sealing member 19 is abutted with the bottom face of the seal arrangement groove 38 with a predetermined abutting pressure and an outer periphery of the sealing member 19 is abutted with an inner peripheral face of the tube part 15c with a predetermined abutting pressure.

The screw engaging parts 15d are formed on outer peripheral sides relative to the tube part 15c. Further, the screw engaging part 15d is formed at four positions on both the right and left sides and both the upper and lower end sides of the tube part 15c. The screw engaging part 15d is formed in a substantially cylindrical tube shape and a female screw is formed on its inner peripheral face. The main body frame 18 is fixed to the front face cover 15 by screws inserted into the insertion holes 39 from a rear side and threadedly engaged with the screw engaging parts 15d. In a state that the main body frame 18 is fixed to the front face cover 15, the front face of the partition part 24 and the rear end of the tube part 15c are abutted with each other.

The flange part 15e is formed in a substantially rectangular frame shape which is long in the upper and lower direction. The flange part 15e is disposed on an outer peripheral side relative to the screw engaging parts 15d formed at four positions. A front face and a rear face of the flange part 15e are formed in flat face shapes which are perpendicular to the front and rear direction. The first protruded part 15a and the second protruded part 15b are protruded to a front side relative to the flange part 15e.

An opening part 47 is formed in a front panel (not shown) of a host apparatus on which the card reader 1 is mounted (see FIG. 1) and a front face of the flange part 15e is fixed in an abutted state with a rear face of the front panel. Specifically, the front face of the flange part 15e is fixed in an abutted state with the rear face of the front panel around the opening part 47. The first protruded part 15a and the second protruded part 15b are protruded to the front side from the opening part 47. The front face of the flange part 15e is fixed to the rear face of the front panel through the sealing member so that liquid such as water does not enter to the rear side of the front panel through the opening part 47.

The case main body 16 is formed in a substantially rectangular parallelepiped box shape whose front end is opened. The case main body 16 is fixed to the front face cover 15 in a state that its front end is abutted with the rear face of the flange part 15e. A portion of the main body frame 18 on the rear side relative to the partition part 24 is disposed in an inside of the case main body 16, and the card accommodation part 23, the control circuit boards 4 and 8, the solenoid 10 and the like are accommodated in the case main body 16.

(Principal Effects in this Embodiment)

As described above, in this embodiment, the first side face part 28g of the card accommodation part 23 is formed with the opening part 28k in which the IC contact block 6 is disposed and is formed with the opening parts 28n and 28p and the through-holes 28q. The first side face part 28g is fixed with the cover member 30 which covers the IC contact block 6, the opening parts 28k, 28n and 28p and the through-holes 28q from the left side, and a portion of the main body frame 18 on the rear side relative to the passage port 36 is sealed and closed. Further, in this embodiment, the ring-shaped sealing member 19 disposed in the seal arrangement part 25 is crushed from the outer peripheral side by the tube part 15c which is disposed so as to surround the portion where a card 2 is passed on a rear side of the front face cover 15. In addition, in this embodiment, the partition part 24 and the seal arrangement part 25 are formed with the passage opening where lead wires extended from the magnetic head 3 are passed and the passage opening is filled with sealing material. Further, in this embodiment, for a portion of the lock lever 9 on the front side relative to the partition part 24, the cover member 44 is attached for preventing liquid from entering to the rear side through the passage opening for the lock lever 9 formed in the partition part 24 and the seal arrangement part 25. In addition, in this embodiment, the control circuit boards 4 and 8 are disposed on a rear side relative to the passage port 36 on an outer side of the card accommodation part 23. Therefore, in this embodiment, liquid such as water entered through the insertion port 14 can be prevented from entering to the arrangement portions of the control circuit boards 4 and 8 and to the arrangement portion of the solenoid 10.

In this embodiment, a front face of the flange part 15e of the front face cover 15 is fixed to a rear face of the front panel through the sealing member so that liquid such as water does not enter to a rear side of the front panel through the opening part 47 formed in the front panel of a host apparatus. Therefore, liquid can be prevented from entering to the arrangement portions of the control circuit boards 4 and 8 and the arrangement portion of the solenoid 10.

In this embodiment, the through-holes 28q are formed on a lower end side of the first side face part 28g. Therefore, according to this embodiment, liquid accumulated between the first side face part 28g and the cover member 30 can be drained to an inside of the card accommodation part 23 through the through-holes 28q and, as a result, the liquid drained to the inside of the card accommodation part 23 can be discharged to the outside of the card reader 1 through the insertion port 14.

Especially, in this embodiment, the lower end portion of the side wall part 30b is inclined with respect to the front and rear direction when viewed in the right and left direction so that liquid accumulated between the first side face part 28g and the cover member 30 flows toward the through-holes 28q. Therefore, liquid accumulated between the first side face part 28g and the cover member 30 can be effectively drained to an inside of the card accommodation part 23 through the through-holes 28q. Further, in this embodiment, the inner side faces of five corner parts of the side wall part 30b formed in a substantially pentagonal frame shape are formed in curved face shapes. Therefore, in comparison with a case that inner peripheral faces of five corner parts of the side wall part 30b are formed so that two flat faces are connected with each other, liquid is hard to be accumulated on an inner peripheral face of each of the corner parts of the side wall part 30b. Accordingly, in this embodiment, liquid accumulated between the first side face part 28g and the cover member 30 can be effectively drained to an inside of the card accommodation part 23 through the through-holes 28q.

In this embodiment, the through-hole 28q is formed in an elongated circular shape whose longitudinal direction is the front and rear direction. Therefore, according to this embodiment, even when the through-hole 28q is formed in the first side face part 28g structuring a side face of the card accommodation part 23, a rear end of an inserted card 2 is hard to be caught by the through-hole 28q. In accordance with an embodiment of the present invention, even in a case that the through-hole 28q is formed in a circular shape or in an elliptic shape whose major axis direction is the front and rear direction, a rear end of an inserted card 2 is hard to be caught by the through-hole 28q.

In this embodiment, the first side face part 28g is formed with the opening part 28p for leading around the cable 7. Further, in this embodiment, the recessed part 29g is formed in the second accommodation frame part 29b at a position facing the opening part 28p and the cable holding part 28r. Therefore, according to this embodiment, the cable 7 that is a flexible printed circuit board can be loosely led around by utilizing the opening part 28p and the recessed part 29g. Accordingly, in this embodiment, even when the cable 7 is moved together with the IC contact block 6 which is moved in the front and rear direction and the right and left direction, a load can be prevented from concentrating on a particular portion of the cable 7 and thus disconnection of the cable 7 is prevented. Further, in a case that a space in the rear side portion of the card accommodation part 23 is narrow, liquid reached to the rear side portion of the card accommodation part 23 is easily accumulated in the rear side portion of the card accommodation part 23 by operation of its surface tension. However, according to this embodiment, a relatively large space can be formed in the rear side portion of the card accommodation part 23 by the opening part 28p and the recessed part 29g and thus liquid is hard to be accumulated in the rear side portion of the card accommodation part 23. Further, a relatively large space can be formed in the rear side portion of the card accommodation part 23 and thus dust and dirt entered to the rear side portion of the card accommodation part 23 can be discharged together with liquid.

In this embodiment, sealing material is applied to the connected portion of a plurality of the IC contact points 5 with the cable 7. Therefore, according to this embodiment, even when the connected portion of the IC contact points 5 with the cable 7 is disposed in an area where liquid may enter, a short circuit due to liquid in the connected portion of a plurality of the IC contact points 5 with the cable 7 can be prevented.

In this embodiment, the first side face part 28g is formed with the guide part 28m for preventing displacement in the upper and lower direction of the IC contact block 6. Therefore, according to this embodiment, rattling in the upper and lower direction of the IC contact block 6 which is moved in the front and rear direction and the right and left direction is prevented and thus a terminal part formed on the surface of a card 2 can be surely contacted with the IC contact points 5.

(Other Embodiments)

Although the present invention has been shown and described with reference to a specific embodiment, various changes and modifications will be apparent to those skilled in the art from the teachings herein.

In the embodiment described above, the cover member 30 is formed in a substantially pentagonal shape when viewed in the right and left direction. However, the present invention is not limited to this embodiment. For example, the cover member 30 may be formed in a polygonal shape other than a substantially pentagonal shape when viewed in the right and left direction. Further, the cover member 30 may be formed in a circular shape, an elliptic shape or an elongated circular shape when viewed in the right and left direction.

In the embodiment described above, a sealing member may be disposed between a front end of the case main body 16 and a rear face of the flange part 15e. In this case, even when a front face of the flange part 15e is fixed to a rear face of a front panel of a host apparatus without using a sealing member, liquid can be prevented from entering to arrangement portions of the control circuit boards 4 and 8 and an arrangement portion of the solenoid 10. Further, in the embodiment described above, sealing material may be applied to screwing positions for fixing the front face cover 15 to the case main body 16 and screwing positions for fixing the first accommodation frame 28b to the second accommodation frame 29b.

In the embodiment described above, the card reader 1 is arranged so that the "Z" direction in FIG. 1 and the vertical direction are coincided with each other. However, the present invention is not limited to this embodiment. For example, the card reader 1 may be arranged so that the "Y" direction in FIG. 1 and the vertical direction are coincided with each other. In this case, the card reader 1 is arranged so that the "Y2" direction side is located on an upper side. Further, in the embodiment described above, the card reader 1 includes the magnetic head 3 but the card reader 1 may include no magnetic head 3.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card comprising an IC chip, the card reader comprising:
   a plurality of IC contact points structured to communicate data with an IC chip of the card;
   an IC contact block which holds the plurality of the IC contact points;
   a cable comprising a first end side connected with the plurality of the IC contact points;
   a control circuit board with which a second end side of the cable is connected;
   a front face cover which comprising an insertion port for the card;
   a main body frame which is fixed to the front face cover; and
   a sealing member which is formed in a ring shape and is disposed between the front face cover and the main body frame;
   wherein when an inserting direction of the card which is one of moving directions of the card is referred to as a first direction, an extracting direction of the card which is the other of the moving directions of the card is referred to as a second direction, one side in a thickness direction of the card which is perpendicular to the moving direction of the card is referred to as a third direction, and the other side in the thickness direction of the card is referred to as a fourth direction, the main body frame comprises:
   a card accommodation part in which a first direction side of the card inserted into the insertion port is accommodated; and
   a seal arrangement part which is disposed on a second direction side relative to the card accommodation part and in which the sealing member is disposed so that an inner periphery of the sealing member is abutted;
   wherein the card accommodation part comprises:
      an accommodation main body part in which the first direction side of the card is accommodated; and
      a cover member which is fixed from a third direction side to a first side face part of the accommodation main body part that is a side face on the third direction side;
   wherein the first side face part comprises a first part in which the IC contact block is disposed so as to penetrate through the first side face part;
   wherein the cover member is fixed to the first side face part so as to cover the IC contact block and the opening part;
   wherein a second direction end of the seal arrangement part comprises a passage port where the first direction end of the card inserted into the insertion port is passed;
   wherein the control circuit board is disposed outside the card accommodation part on the first direction side relative to the passage port;
   wherein the front face cover comprises a tube part in a tube shape which is disposed on at least the first direction side of the front face cover so as to surround a portion where the card is passed;
   wherein an inner peripheral face of the tube part crushes the sealing member in a radial direction from an outer peripheral side of the sealing member; and
   wherein a portion on the first direction side of the main body frame relative to the passage port is sealed.

2. The card reader according to claim 1, wherein a portion of the first side face part which is covered by the cover member comprises a through-hole penetrating through the first side face part.

3. The card reader according to claim 2, wherein when a direction perpendicular to the moving direction of the card and the thickness direction of the card is referred to as a fifth direction,
   the card reader is arranged so that the fifth direction is coincided with a vertical direction, and
   the through-hole is formed on a lower end side of the portion of the first side face part which is covered by the cover member.

4. The card reader according to claim 3, wherein
   the cover member comprises a lower wall part structuring an under face of the cover member, and
   an upper face of the lower wall part is inclined with respect to the moving direction of the card when viewed in the thickness direction of the card so that liquid accumulated between the first side face part and the cover member flows toward the through-hole.

5. The card reader according to claim 2, wherein
   the cover member is formed so that its shape when viewed in the thickness direction of the card is a substantially polygonal frame shape and is provided with a side wall part parallel to the thickness direction of the card, and
   an inner side face of each of corner parts of the side wall part whose shape when viewed in the thickness direction of the card is a substantially polygonal frame shape is formed in a curved face.

6. The card reader according to claim 2, wherein the through-hole is formed in a circular shape, or in an elongated circular shape whose longitudinal direction is the moving direction of the card, or in an elliptic shape whose major axis direction is the moving direction of the card.

7. The card reader according to claim 1, wherein
the IC contact block is movable in the moving direction of the card,
the cable is a flexible printed circuit board,
the accommodation main body part comprises a second side face part which is a side face on a fourth direction side of the accommodation main body part,
the first side face part comprises a second opening part for leading around the cable on a first direction side relative to the second opening part so as to penetrate through the first side face part, and
the second opening part is covered by the cover member, and
the second side face part comprises a recessed part which is recessed toward the fourth direction at a position facing the second opening part.

8. The card reader according to claim 1, wherein sealing material is applied to an attaching portion of the cover member to the first side face part.

9. The card reader according to claim 1, wherein sealing material is applied to a connected portion of the plurality of IC contact points with the cable.

10. The card reader according to claim 1, wherein when a direction perpendicular to the moving direction of the card and the thickness direction of the card is referred to as a fifth direction,
the IC contact block is movable in the moving direction of the card, and
the first side face part comprises a guide part which prevents displacement in the fifth direction of the IC contact block moved in the moving direction of the card.

* * * * *